March 10, 1931.  F. J. BALDWIN  1,795,821
SKATE WHEEL
Filed Feb. 1, 1930
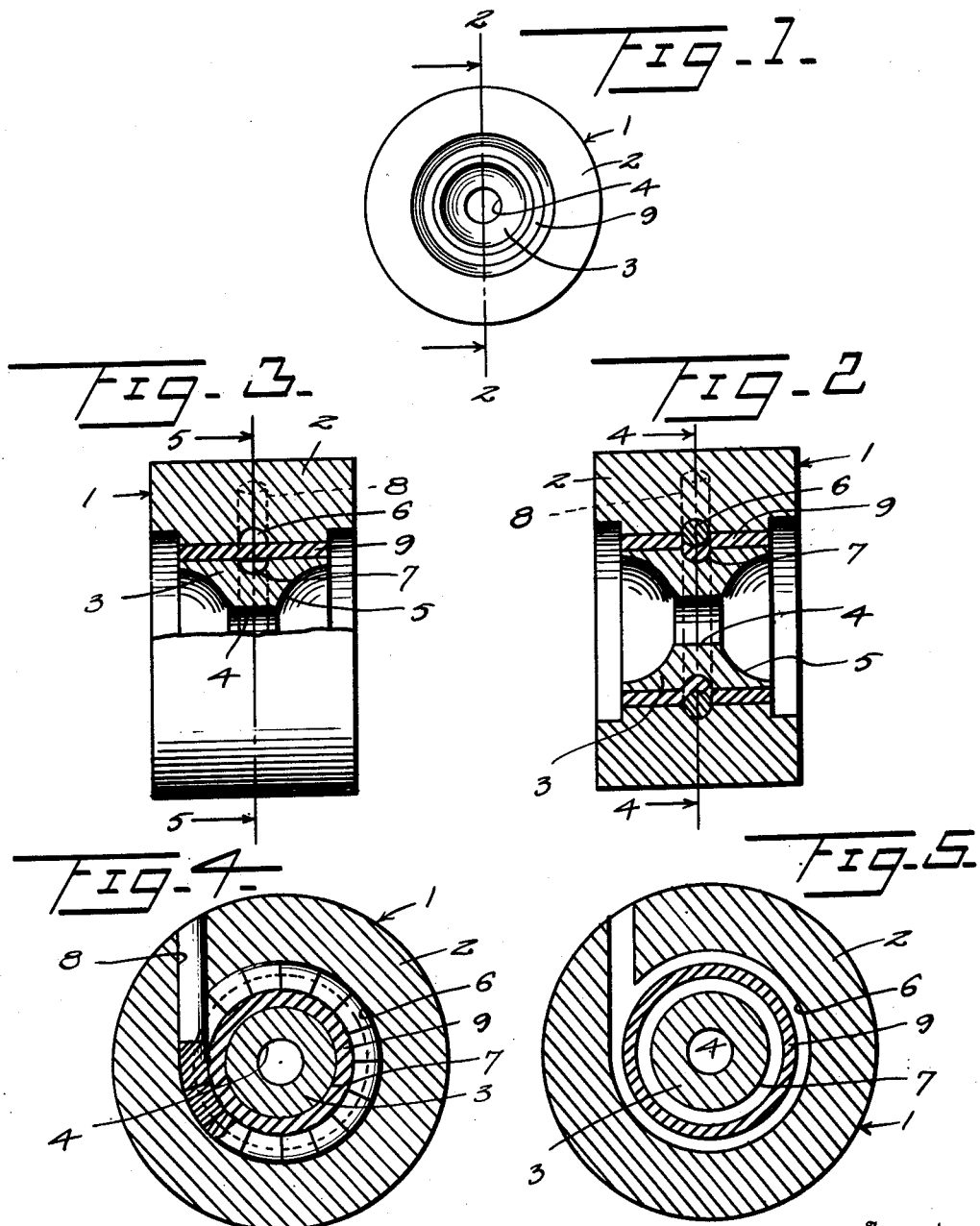
Inventor
F. J. Baldwin
By Watson E. Coleman
Attorney Patented Mar. 10, 1931

1,795,821

UNITED STATES PATENT OFFICE

FRANCIS J. BALDWIN, OF RAVENNA, OHIO

SKATE WHEEL

Application filed February 1, 1930. Serial No. 425,281.

This invention relates to improvements in the construction of wheels designed particularly for use on roller skates.

The primary object of the present invention is to provide an improved type of wheel and method of making the same whereby a great amount of the noise created by the skate wheels when in use, particularly where the skates are used on indoor rinks, will be eliminated.

The invention broadly contemplates the provision of a wheel having an outer or shell portion of any suitable material and an inner ball bearing carrying hub between which shell and hub is interposed a rubber ball.

A further object of the invention is to provide means whereby this rubber ball interposed between the shell and the hub may be firmly secured in place, the securing means acting to lock the shell, hub and interposed rubber ball together forming the wheel as an inseparable unit.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of a wheel constructed in accordance with the present invention.

Figure 2 is a sectional view taken on the line 2—2 of Figure 1.

Figure 3 is a view partly in elevation and partly in section radially of the wheel showing the relation of the elements before the insertion of the securing slugs.

Figure 4 is a sectional view taken on the line 4—4 of Figure 2.

Figure 5 is a sectional view taken on the line 5—5 of Figure 3.

Referring more particularly to the drawing wherein like numerals of reference indicate corresponding parts throughout the several views, the numeral 1 indicates generally a skate wheel constructed in accordance with the present invention. As shown this wheel comprises an outer portion or shell 2 which may be constructed of a suitable fiber, hard rubber or metal such as aluminum, according to the use to which the wheel or the skates of which it forms a part may be put, that is whether the skates are to be used out of doors or on indoor rinks.

In the center of the shell 2 and concentric therewith is a hub 3 of the usual design, that is it has the usual central opening 4 for the passage of a supporting shaft and the raceways 5 at each end for the reception of the bearing balls (not shown) which surround the supporting shaft in the usual manner.

The interior of the shell 2 is provided with an annular groove 6 of substantially semicircular cross-section as shown and the peripheral face of the hub body 3 is provided with a similar circumferential groove 7. The body 2 is also provided with a passage 8 formed tangential to the inner wall thereof as shown in Figure 5, this passage 8 entering the groove 6.

In the completed wheel there is interposed between the shell 2 and the hub 3 a rubber sleeve 9. This sleeve is provided in the form of a tube from which a length is cut equal to the thickness of the hub and the exterior diameter of the sleeve is such that when it is slipped over the hub the over-all diameter of hub and sleeve will be slightly greater than the interior diameter of the shell. The sleeve 9 may be suitably secured to the hub by the use of cement and in order to insert the sleeve carrying hub into the shell the exterior surface of the sleeve is covered with rubber cement which acts as a lubricant if the hub and sleeve are quickly inserted after the cement has been applied. As will be readily understood the cement will then serve to firmly secure the sleeve in position between the hub and the shell.

After the hub and sleeve have been placed in position in the shell suitable keying or locking slugs, such for example as small lead bars may be inserted in the passage 8 and forced through into the groove 6 of the shell. By inserting a number of these slugs they will be forced around the groove 6 at the same time forcing the adjacent part of the sleeve 9 down into the groove formed about the face of the core or hub 3. From this it will be readily seen that the three elements, shell, sleeve and hub will be firmly locked together and after the operation of inserting the slugs is complete the passage 8 may be closed in any suitable manner such for example as by driving thereinto a fibrous or soft metal plug.

In addition to the foregoing method of keying the wheel shell and hub together I have found that a single piece of aluminum wire may be employed which can be driven into the passage 8 and will follow around in the groove 6 to form a one piece key therein. Where the wheels 2 are made of wood it has been found advantageous to employ two passages 8 arranged in substantially parallel relation and at opposite sides of the wheel hub so that fiber slugs or solder wire may be used, inserting the material at two points instead of at one point as shown in Figure 4. By this construction the use of slugs may be done away with if found desirable so that the construction of the wheels may be expedited.

It has been found in practice that the keying material used should be of a character which will wear at substantially the same rate as the material of which the wheels are formed so that the traction surfaces of the wheels will remain smooth as the wheels wear.

Skate wheels constructed in accordance with the present invention diminish to a great extent the noise created when skating, particularly when skating on wood floors such as are frequently provided in indoor rinks as the rubber sleeves 9 act as shock absorbers and also as noise absorbers preventing the transmission from the loose and usually rattly bearing balls of sound through the shell to the rink floor.

Having thus described my invention, what I claim is:—

1. A wheel of the character described, comprising an outer or shell portion, a hub within the shell, said hub and shell having complementary grooves formed in their opposing faces, a resilient body interposed between the shell and hub, and locking means positioned in one of said complementary grooves and acting to force that portion of the resilient body adjacent thereto into the other groove to lock the elements of the wheel together.

2. A wheel of the character described, comprising an outer or shell portion, a hub within the shell, said hub and shell having complementary grooves formed in their opposing faces, a resilient body interposed between the shell and hub, locking means positioned in one of said complementary grooves and acting to force that portion of the resilient body adjacent thereto into the other groove to lock the elements of the wheel together, and means for inserting said locking means into the groove occupied thereby in the form of slugs and from the exterior of the wheel.

3. A wheel of the character described, comprising an outer shell, a hub adapted to fit within the shell, a rubber sleeve surrounding said hub and tightly held between the same and the shell, said hub and shell having complementary grooves in their opposing faces, said grooves being separated by said sleeve, said shell further having a passage formed therethrough from an exterior face thereof to and entering the groove therein, and locking slugs insertable through said passage into the groove of the shell, said slugs surrounding the hub and acting to force the adjacent portion of the sleeve into the hub groove.

In testimony whereof I hereunto affix my signature.

FRANCIS J. BALDWIN.